United States Patent Office 3,511,027
Patented May 12, 1970

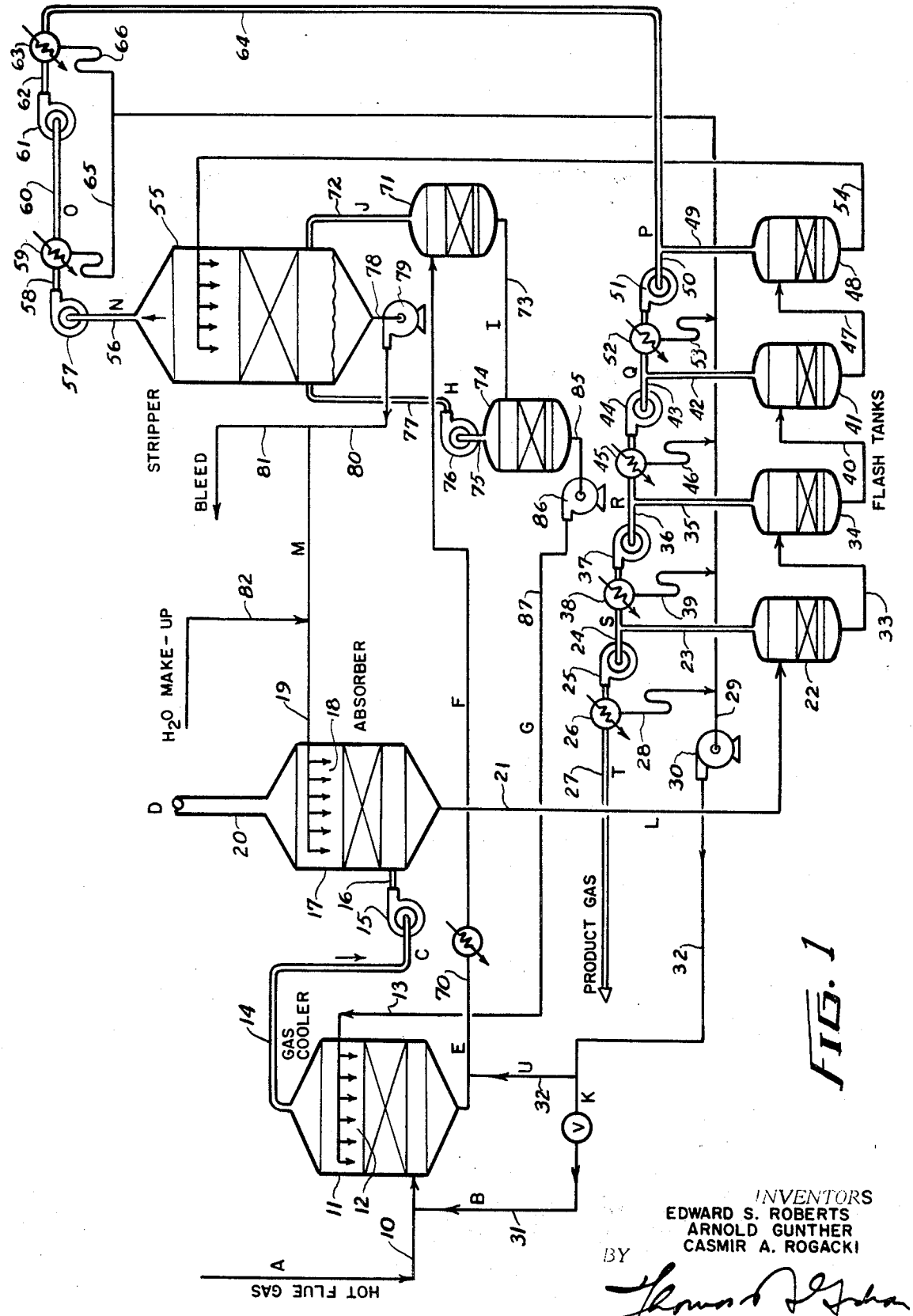

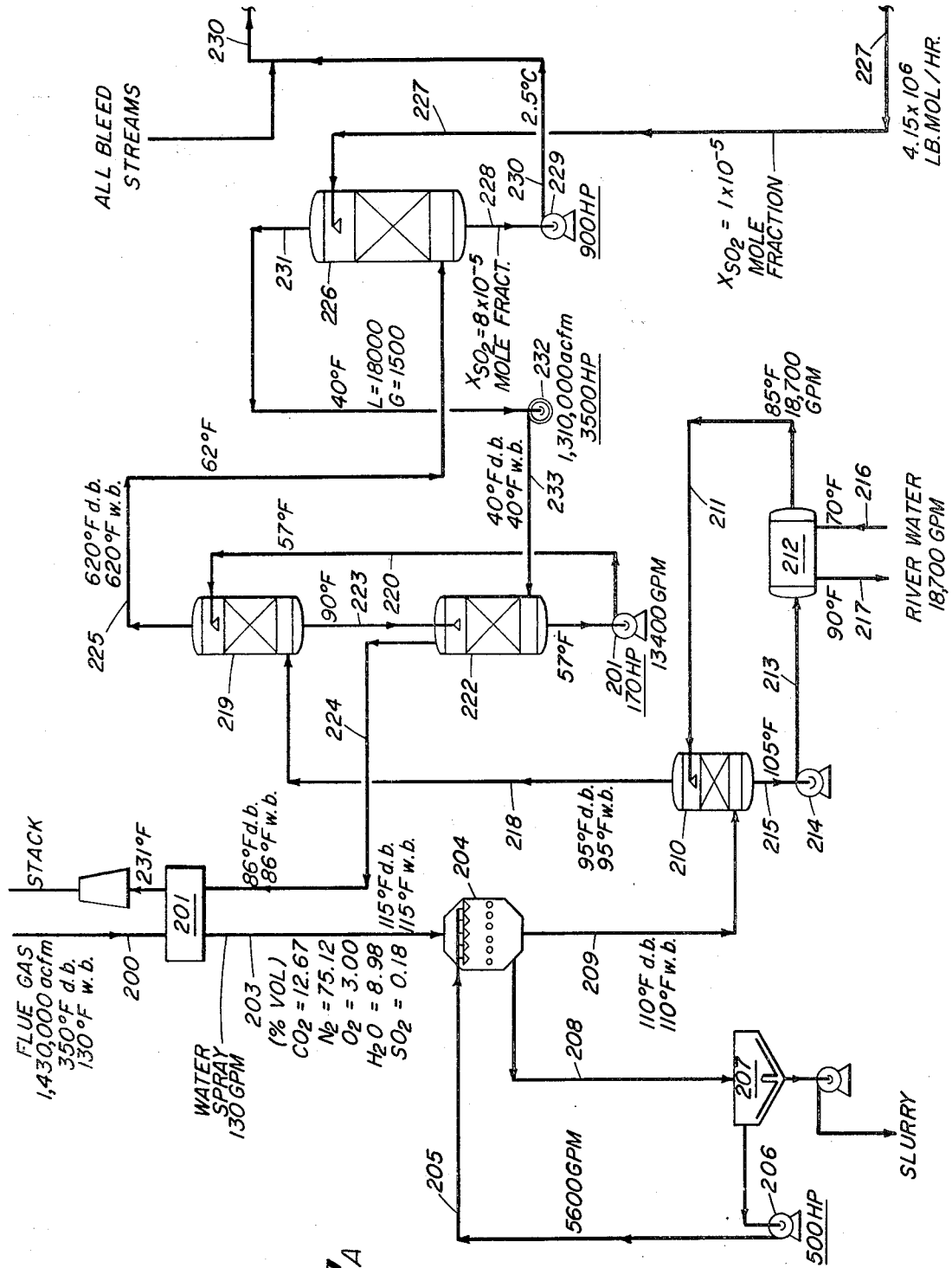

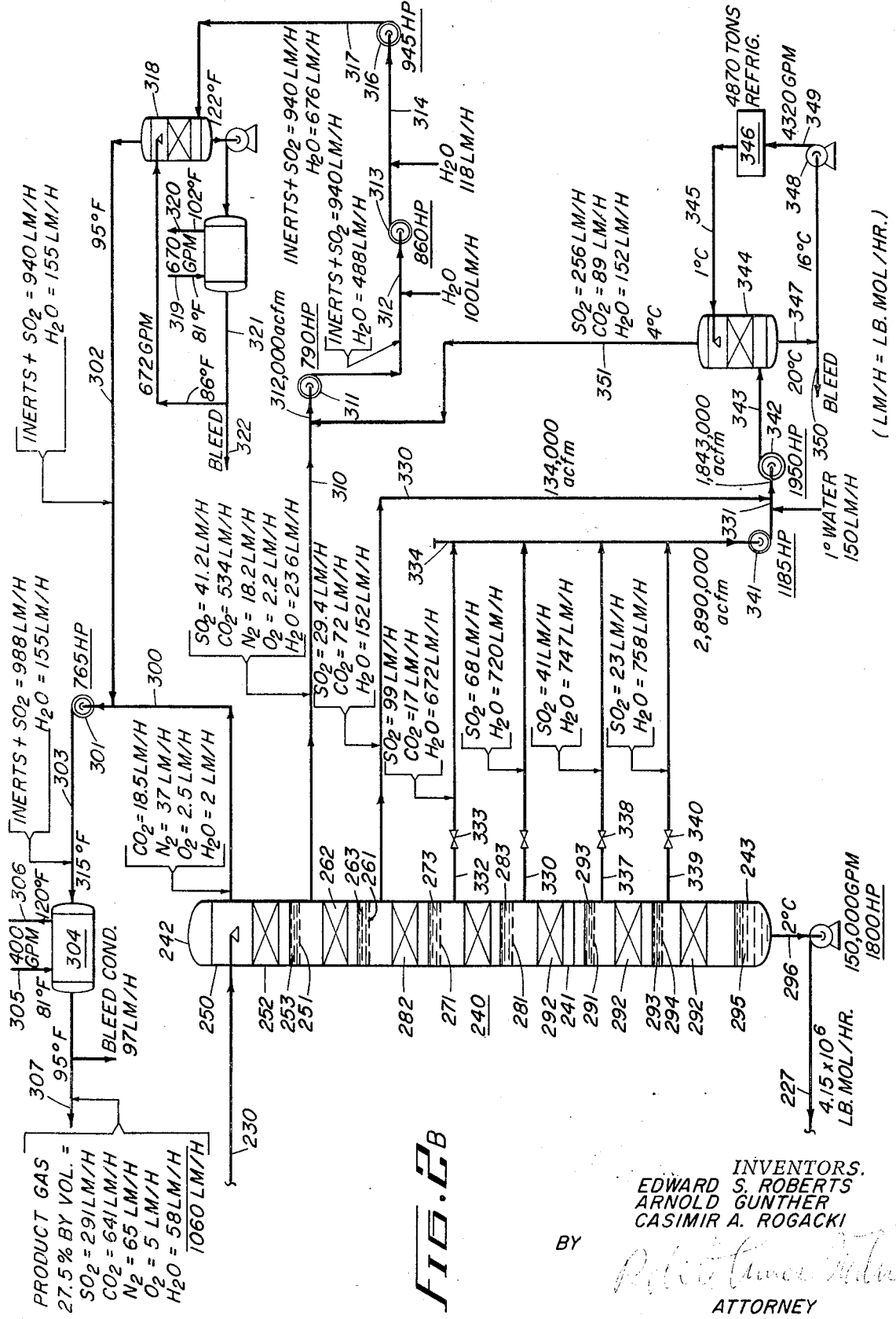

3,511,027
SULFUR DIOXIDE RECOVERY PROCESS
Edward S. Roberts, Ridgewood, N.Y., and Arnold Gunther, West Orange, and Casimir A. Rogacki, Waldwick, N.J., assignors to Treadwell Corporation, New York, N.Y., a corporation of New York
Continuation-in-part of application Ser. No. 589,332, Oct. 25, 1966. This application Mar. 26, 1968, Ser. No. 724,664
Int. Cl. B01d 19/00
U.S. Cl. 55—44           8 Claims

ABSTRACT OF THE DISCLOSURE

The invention is embodied in a process and an apparatus system wherein flue gas from combustion operations, i.e., power plants, incinerators, industrial installations, paper mills, ore roasters, etc., wherein sulfur appears in elemental or combined form in the fuel or material burned, is treated to remove the sulfur dioxide produced, the process being carried out to recover a very substantial part of the sulfur dioxide. The process includes the steps of cooling the gas substantially to ambient outdoor atmospheric temperature, i.e., 32° F. to 125° F., absorbing $SO_2$ in water at temperatuure in that range, and recovering from the water solution an enriched $SO_2$ product gas, useful as such, or useful for liquefaction and recovery of pure $SO_2$, the recovery being carried out at ambient temperature, so that overall the process may be said to be substantially isothermic. The apparatus aspect of the invention resides in the combination of units, cooler, absorber, stripper, flash apparatus and pumps, consituting means for recovering, pumping and handling the quantities of gas and water involved.

A quasi-continuous staging flash modification is also described which effects substantial savings in the volume of gas to be handled. Recovery of sulfur dioxide is the most important field, but the same procedures may be used to recover and concentrate other dissolved gases.

REDATED APPLICATIONS

This application is a continuation-in-part of our earlier filed application Ser. No. 589,332, filed Oct. 25, 1966, and now abandoned.

BACKGROUND OF THE INVENTION

Sulfur dioxide-containing gases containing 3% or more of $SO_2$ and an excess of oxygen may be treated in a sulfuric acid plant contact converter. For lower concentrations the conversion is technically, but not economically, feasible.

Sulfur dioxide-containing gases containing lower concentrations of $SO_2$ have been treated by absorption with alkaline aqueous solutions or slurries, for example, soda ash, lime, ammonia or amines in solution or suspension. The gases are absorbed in a scrubber which is typically a packed tower in which the gas rises against a downward flowing stream of the absorbing solution or suspension.

When the absorbing suspension is one of lime, the $SO_2$ is reacted to form a suspension of calcium sulfite which reacts more or less completely with oxygen to produce gypsum as a waste or by-product.

With solutions of soda ash or ammonia the sulfur dioxide reacts to form bisulfites of sodium or ammonium. Processes have been proposed and used in which these bisulfite solutions have been subjected to desorption, typically in stripping towers using steam or air and producing a gas stream richer in $SO_2$ than the gas stream to the absorber and a solution containing sulfites, bisulfites and bicarbonates for return to the absorption stage.

During the cycle some of the sulfite or bisulfate is oxidized to sulfate. In systems using ammonia this is converted to a fertilizer grade of ammonium sulfate by evaporation of a bleed stream and replaced in the system with anhydrous ammonia.

Amine solutions and suspensions have also been used in a similar cycles. Xylidine and dimethyl aniline have been favored for this purpose. Compared with ammonia these are less volatile and may be used in more alkaline solutions which are more effective absorbers at lower concentrations of $SO_2$ in the gas. They are, however, more expensive and sulfate formation presents a problem of removal and regeneration using lime.

Ordinary water has been used to absorb $SO_2$ from power plant flue gas. The water solution of sulfur dioxide has then been discarded to a sewer and replaced with fresh water or, alternately air stripping has been used, producing another gas stream containing $SO_2$.

Sulfur dioxide represents a serious atmospheric pollutant when fuels are burned having a considerable content of $SO_2$, such as for example large power plants, certain smelters, and the like. Incinerators also generate sulfur dioxide from sulfur in fuel products, paper, plastics, and other trash.

If fuel or materials to be incinerated were free of sulfur, there would be no problem of this kind of pollution. However, the usual fuel oil will contain about 3% of sulfur by weight and will give a sulfur dioxide concentration in the combustion gas discharged from burners using it of about 0.2% by volume. The precise percentage concentration of the sulfur dioxide in the flue gas is, of course, variable with the amount of excess air which is in the combustion gas. In ordinary practice about 15-20% excess air by volume beyond the stoichiometric requirement is used. Most other fuels require higher amounts of excess air.

SUMMARY OF THE INVENTION

The present invention provides a method for recovering sulfur dioxide from flue gases or, in some cases, other gases from other operations which are to be recovered and concentrated. The description will be primarily in connection with the recovery and concentration of sulfur dioxide, which is the most important single field for the present invention. Other gases will be mentioned further below.

In temperate climates the present invention will generally be operated under outdoor conditions with an outdoor temperature ranging from about 35° F. to about 125° F. For this purpose water is used as the absorbent; and normally the water will be flowing into the system either at the temperature of a large source of water, such as a river, or where cooling towers are used, at a temperature approximately corresponding to the wet bulb outdoor temperature. As will be described below, the water passing through the system is repeatedly exposed to hot flue gases, and therefore the temperatures at various stages will be somewhat above atmospheric temperatures, at least in mild seasons. In wintertime, of course, the water must be at a temperature above its freezing point.

It will be noted from the further description that the process of the present invention takes advantage of differential solubility effects based on the Henry constants of sulfur dioxide as compared with carbon monoxide, carbon dioxide, nitrogen and oxygen, which will be present in the flue gases. When other gases are to be recovered, the operation will depend on the Henry constants of these gases.

An important advantage of the present invention is that the sulfur dioxide is finally produced at sufficient concentration so that it can be used directly to produce sulfuric acid in the contact plant or otherwise utilized, for example by liquefaction where liquid sulfur dioxide is desired. It is also possible to separate carbon dioxide in the latter case. Because the present invention is particularly important in large industrial operations where air pollution from sulfur dioxide is most serious, it will be, in general, described in connection with a large central station of 1,000 mega-watt capacity.

Since the invention is based on the utilization of the differential solubilities of sulfur dioxide in water as compared to the other gases present, it will be noted that the process proceeds in a sequence of steps employing a large volume of water which preferably recirculates in a closed system, first to cool the starting gas substantially to the temperature of the recirculating water, then to absorb it under substantially atmospheric pressure to as great an extent as practical and, finally, to flash at progressively lower pressures in a number of steps. These steps may be step separated by substantially large pressure levels or there may be a quasi-continuous stage flashing where the pressure levels between stages are very small, which presents definite advantages in gas volume evolved. Both modifications are effective, and the choice is largely one of economics. Because of the savings in volume of gases where a quasi-continuous flash is used, this modification is often preferable, particularly in connection with large installations.

The degree of initial absorption of sulfur dioxide of course represents a compromise. Most of the descriptions which follow will be based on an approximate absorption of about 75% of the sulfur dioxide in the combustion gases, but the invention, of course, is not limited to this exact amount.

Essentially, the absorption of the sulfur dioxide is effected in two steps: first, a direct contact water spray cooler, in which the primary function is to cool the gases down to a temperature at which effective absorption can be obtained; followed by an absorber, where more water is sprayed and the major portion of the absorption takes place. There will be some solution of sulfur dioxide in the cooler and, as pointed out below, the recycling features of the process permit effective recovery of practically all of the sulfur dioxide which may have been absorbed in cooling down the gases. The absorber is preferably operated as a packed tower to permit intimate contact of gas and water. In general counter-current flow is preferred in these two stages or pieces of apparatus, although other flow schemes, such as cross-flow, co-current flow, and the like may be used if desired and are included in the broader aspects of the invention. The adsorber vents a waste gas from which about 75% of the sulfur dioxide has been removed and relatively larger amounts of oxygen and nitrogen as well as carbon monoxide and carbon dioxide. This gas can be wasted to the atmosphere as the sulfur dioxide level is reduced to a small fraction of a percent, for example 0.05% $SO_2$, which is sufficiently low to meet most current air pollution standards. Of course the invention is not limited to discharging such gases from the adsorber, and where desired this gas can be subjected to further treatment. However, it is an advantage of the invention that ordinarily this is not necessary, though not excluded from the scope of the invention in its broadest aspects.

It will be apparent that the present invention, in its absorption phase at least, depends on maximum solubility of sulfur dioxide in water, which is aided if ionization takes place. Some care should therefore be taken to prevent undue inhibition of ionization, for example by small amounts of sulfur trioxide, which may be present in the initial combustion gases or may be formed to some extent by oxidation of $SO_2$ in the processing steps. As will be described below, the content of such materials which would reduce ionization can be kept low by suitable purging of small amounts of water at certain points or by other well known means. The sulfur trioxide content is not necessarily lost, because when the present invention is used in conjunction with a contact sulfuric acid plant, which is very commonly the case, the purged or bled water containing sulfur trioxide or sulfuric acid can be used as solution water in an acid plant.

The dilute solution of sulfur dioxide from the absorber, which will usually have concentrations of the order of $10^{-3}$ mol fraction or less, is then subjected to flashing at progressively lower pressure, followed by a final stripping, which may be at a higher temperature, utilizing low pressure steam produced from other parts of the process. The solution passes in series through the stages, which may, for example, be five stages, and in each flash stage a portion of the gases is flashed at the progressively increasing vacua in the different stages. The flashed gas is then compressed back to atmospheric pressure with suitable interstage cooling to effect removal of water vapor. Typically a product gas is obtained having about 30% of sulfur dioxide as compared to about 0.2% in the original combustion gases and can then be utilized as desired, for example in a contact sulfuric acid plant or in recovery processes for obtaining pure sulfur dioxide.

Examples of such other solutions are solutions of air, carbon dioxide, or nitrogen oxides in water. It will be noted that in the successive flash stages the principal difference from stage to stage is in pressure. In other words, the process constitutes some approximation of an isothermal process. This is particularly true in the quasi-continuous flash, which will be described below. The number of stages either in separate stages or in a quasi-continuous operation is dictated largely by economics, as after about five stages the law of diminishing returns sets in and it is normally undesirable to go much beyond this, although as many as ten stages can be used if desired.

In order to minimize the work of compression, in a preferred embodiment of this invention the desorption of sulfur dioxide is conducted in multiple stages at progressively lower pressure. At each stage there occurs an incremental desorption of sulfur dioxide.

While it is possible to effect vacuum desorption in a single stage, this is not preferred as the ratio of volume of water vapor to that of sulfur dioxide increases greatly at lower pressure desorption if there is only a single stage. In the multi-stage desorption, which is preferred, most of the sulfur dioxide is desorbed at higher pressures, though in most zones or stages the pressures are still subatmospheric. Under these conditions the vaporization of water vapor is greatly reduced.

To illustrate the advantage which is realized by the multiple staging of sulfur dioxide desorption, we select in an example an aqueous solution at 30° C. containing $10^{-4}$ mol fraction of $SO_2$. It is assumed that desorption is conducted to a final concentration of $10^{-6}$ mol fraction in the aqueous solution, a desorption of 99%. To achieve this degree of desorption the solution must be subjected to a pressure of 32 mm. of mercury or less. At this pressure the volume of gas and water vapor to be compressed is 0.078 mol per mol of solution; of this only 0.0001 mol consists of sulfur dioxide, the remainder being water vapor.

On the other hand, using 5 stages of multiple stage desorption, the lowest stage being at 32 mm. Hg, the total amount of gas and vapor to be compressed amounts to 0.004 mol per mol of solution, only 5% of the amount in the single stage desorption process. Of course with more stages the percentage of total gas and vapor is even less, but the advantage of having more than five stages is but slight.

Single stage desorption of sulfur dioxide is impaired by the cooling effect of the evaporation of water which cools the aqueous solution considerably. In multi-stage desorption this is much less of a problem owing to the smaller amount volatilized.

The advantages of multi-stage desorption are greater the greater the percentage of desorption. This is shown in the following table in which the quantity of gas and vapor in moles is compared in single stage vs. that in multi-stage desorption at various levels of desorption. In the table the comparison of the quantities of gas and vapor is expressed as a ratio and the level of desorption is expressed as a percent of the dissolved sulfur dioxide which is desorbed (removed from solution).

| Desorption in percent: | Ration: moles gas and vapor single stage vs. multiple stage |
|---|---|
| 50 | 1.44 |
| 70 | 1.94 |
| 90 | 3.91 |
| 95 | 6.34 |
| 97 | 9.25 |
| 99 | 21.5 |
| 99.9 | 145 |

In carrying out this invention the apparatus for each stage consists of a means for providing an interfacial surface for the transfer of sulfur dioxide from the solution to the gas phase which is large at least in the later stages wherein the aqueous solution vapor pressure of sulfur dioxide is low. Under the conditions which prevail in the later stages the difference between this vapor pressure and the partial pressure of sulfur dioxide in the gas phase must be small. This difference constitutes a "driving force" which can overcome the resistance to mass transfer due to the boundary layers in the gas, and in the liquid phase. With a small driving force there is an attendant requirement of a large amount of surface of contact in a packed column absorber.

In carrying out this invention the sections of the packed column used in desorption are separated from one another, e.g., by partitions, to maintain the required pressure differentials. Communication means is provided to permit the flow of solution from stage to stage while preventing the flow of gas and vapor.

The stream of gas and vapor from each stage of desorption is removed from the stage by compression means. The individual streams may be compressed separately or they may be expanded into a header which is common to several stages. The expansion from each stage may be through a constriction or throttle valve, the header being connected to the suction side of a compressor. The final stage is coupled directly to the header without throttling.

As has been stated above, constriction or throttling from each stage except the last results in limiting the amount of water vapor and/or gases other than sulfur dioxide which are evolved in the stage. Starting up of a multi-stage system usually involves some adjustment of the degree of throttling. A typical starting adjustment is as follows: Let us assume that each desorption stage, except the last, is connected with a common header through a variable throttling control valve. The compressor is operated and the aqueous solution of $SO_2$ is made to flow through the several stages in series with all of the throttling valves in the closed positions. This corresponds to a system with single stage desorption.

Each throttling valve is next opened in turn until a position is found corresponding to a minimum manifold pressure. After each valve is adjusted in its turn the sequence of valve adjustment is repeated as many times as is required until no further reduction of the manifold pressure is possible. The system is then at its operating condition. If the concentration of $SO_2$ in the solution is changed, or if the temperature or volume flow of the solution is changed, the throttle valves are readjusted sequentially to an optimum setting for the new conditions. Of course the throttling valve adjustments may be made automatically with a control system based on servo-motor operated valves which are activated to minimize the manifold pressure as well as by other means that will be apparent to one skilled in the art.

When a quasi-continuous stage flashing is used, as in one modification of the present invention, the liquid solution is passed through aseries of chambers, the first chamber being kept at a pressure equal or lower than that of the total vapor pressure, which includes the vapor pressure both of the water and the gas components dissolved therein, which are of interest for recovery or stripping. The last chamber is kept at a pressure equal to the vapor pressure of the solution containing the desired final concentration of the dissolved gas and the intermediate chambers are kept at pressures that decrease from the first to the last one.

The series of chambers may be connected in any convenient way, such as for example forming parts of a single tower with partitions which define them. The gas flashed off at each stage is collected individually and, if desired, the streams from the different stages may be joined outside of the stages and compressed to any desired pressure level. To provide the necessary area for mass transfer, the liquid may be sprayed into the tower or it may flow over suitable packing. This is important with large industrial installations, such as power stations, and some idea of the amount of the materials involved is of interest. Thus, a 1000 megawatt power station, which would be a large consumer of fuel, comparable with any industrial installation burning large amounts of fuel oil, for heat or other purpose, using an oil of 4% sulfur content, would discharge fuel gas at ar ate of about 3,000,000 pound mols per hour (in terms of cubic feet of flue gas at 350° F. this is about 177,000,000 cubic feet).

A typical analysis of a flue gas obtained from such a fuel would be the following:

| | Mol percent | Conversion to weight | Percent by weight |
|---|---|---|---|
| $CO_2$ | 12.67 | ×44=556 | 19.0 |
| $O_2$ | 3.00 | ×32=96 | 3.3 |
| $H_2O$ | 8.96 | ×18=161 | 5.5 |
| $N_2$ | 75.12 | ×28=2,103 | 71.7 |
| $SO_2$ | 0.23 | ×64=14.72 | 0.5 |
| | 100.00 | 2,930.72 | 100.0 |

The quantities flowing in such a stack are:

| | Lbs./hour | Lb. mols/hour |
|---|---|---|
| $CO_2$ | 1,577,000 | 35,800 |
| $O_2$ | 274,000 | 8,550 |
| $H_2O$ | 456,000 | 25,350 |
| $N_2$ | 5,941,500 | 212,000 |
| $SO_2$ | 41,500 | 647 |
| | 8,290,000 | 282,347 |

Gas composition herein are stated by volume percent unless otherwise specified.

Total water flow in a system employing this invention will be about 30,000,000 gallons per hour.

An oil containing 1% of sulfur used in such an installation would give 0.0575 percent sulfur dioxide in the stack gas.

In general the stack gases from a power plant as described will be at a temperature of about 350° F. in order to provide the necessary draft without requiring force draft. Higher flue gas temperatures of 500° to 600° F. are in general too wasteful of heat to be acceptable; however, gases at these temperature levels may be produced in other equipment, such as roasters for sulfide ores, and can, of course, be treated by the process of the present invention.

Before cooling and absorbing sulfur dioxide it is often desirable to remove solids, such as particles as smoke, soot, and dirt, by suitable precipitating equipment.

BRIEF DESCRIPTION OF THE DRAWINGS

FIG. 1 is a flow sheet in semi-diagrammatic form of a modification using separated flash zones, and FIGS. 2A and 2B constitute a similar flow sheet of a quasi-continuous flash staging modification.

DESCRIPTION OF THE PREFERRED EMBODIMENTS

Referring to the modification shown in FIG. 1, the hot flue gas, e.g. at 350° F., enters the system through conduit 10 and passes to cooling zone 11, a large tank, entering near the base thereof, so that the gas can rise countercurrent to a stream of cooling water 12. The gas cooler may be of a conventional construction. Water enters the cooler through conduit 13 near the top and is distributed over contact surfaces in the tank. The interior structure may be any that will induce effective contact of hot gas wtih cool water. Though countercurrent contact of liquid-gas is indicated, parallel flow or cross flow may be used. The effect sought is cooling.

In a 1000 megawatt station, treating 8,300,000 pounds of gas per hour (the typical analysis noted herein), the quantity of water flowing in this stage through conduit 13 is about 1,000,000 pound mols per hour.

The gas passes out of the cooler through conduit 14, having been cooled by evaporation of water to a temperature of the order of about 80° F., and thereafter is moved by blower 15 through conduit 16 into absorber 17. Here, the gas meets a spray of cool water 18 introduced through conduit 19.

The water at this stage is 30,000,000 gallons per hour.

The absorber 17 is preferably a large packed tower to create a large contact area. Its effectiveness for absorbing sulfur dioxide is proportional to the depth of the packing. The pressure generated by the blower 15 need be only sufficient to move the gas through the tower packing, which, in a typical large installation, will be one of about 10–15 inches of water. The effluent gas, stripped of sulfur dioxide to the designed extent, consisting largely of nitrogen, oxygen and water vapor, passes out into the atmosphere through conduit 20. Typically its composition will be 0.05% $SO_2$, 13% $CO_2$, 79% $N_2$, 3% $O_2$, 5% water vapor, all by volume.

Substantially dioxide to be recovered is absorbed in the absorber and its solution in water passes through conduit 21 from the bottom of the absorber to the flash recovery system.

It is in the flash recovery system in combination with the ultimate stripper, where most of the sulfur dioxide gas in the form of an enriched sulfur dioxide-carbon dioxide-oxygen-nitrogen mixture is recovered.

Thus, the aqueous solution of sulfur dioxide carrying about $3 \times 10^{-5}$ mole fraction of sulfur dioxide, $7 \times 10^{-5}$ mole fraction of dissolved carbon dioxide and $8 \times 10^{-6}$ mole fraction of nitrogen, as well as $7 \times 10^{-7}$ mol fraction of oxygen appears in conduit 21. It is the relationship of the Henry constants of these gases which gives the aqueous solution of this composition. Thus, while nitrogen and oxygen are much less soluble than sulfur dioxide, the considerably larger proportion of these which is present in the combustion and flue gas results in a solution present in quantity comparable with the amount of dissolved sulfur dioxide. The solution contains a large amount of sulfur dioxide, simply because it is the objective of the absorption step to dissolve as much of the sulfur dioxide as is reasonably economic and, in dissolving such a large proportion of the sulfur dioxide, present in the gas in only small proportion, the end result is the liquid having substantially this composition.

Also, the solution is at a temperature of about 80°–85° F. as a consequence of the general mode of operation, which is to operate the system out of doors at ambient outdoor temperatures.

While a single flash zone can be used, a number of stages are preferable, and this is shown on the drawing with four flash stages or zones followed by a final zone in the form of a stripper. The solution is introduced into the flash zone via line 21, into first stage of the flash system, tank 22, which is maintained at a pressure of about 400 millimeters of mercury, i.e. about ⅔ atmospheric and a at temperature to flash a gaseous mixture having substantially a maximum proportion of water vapor. This is the immediate stage just before discharge of the product gas. The solution enters the space, preferably is sprayed over contact surfaces, and, being subject to the reduced pressure, gives up a certain proportion of water as vapor and a substantial amount of carbon dioxide, nitrogen, oxygen and sulfur dioxide. At this stage, the mixed gases thus released are taken out through conduit 23 to be discharged into conduit 24, through pump 25, through condenser 26, to remove water vapor, and product gas is discharge to recovery through conduit 27. Water condensed in the condenser 26 is recovered through conduit 28 and returned to circulation in the system, to line 29 where pump 30 forces it through line 31 for reuse. Line 31 is shown passing through gas V introducing water into line 10 for cooling the arriving flue gas. Alternatively, the water can re-enter the system through branch 32 where the water joins the discharge from the gas cooler itself.

At this discharge point from the cooler, the water will carry a certain amount of sulfur dioxide, which is flashed at 71 and 74.

The partially denuded aqueous solution of sulfur dioxide, carbon dioxide, oxygen and nitrogen passes from flash stage 22 through line 33 to flash stage 34, which is maintained at a reduced pressure, for example, about 200 millimeters of mercury, that is, about half the pressure prevailing in the first stage. Additional mixed gases, sulfur dioxide, carbon dioxide, nitrogen and water vapor are evolved in the partial vacuum of stage 34, collected through line 35, passed into product collecting line 36 to be carried by pump 37 through condenser 38, to join the product stream in line 24 which is ultimately discharged through pump 25 into line 27. Water condensed from the gas is recovered through line 39 to join the circulating water in line 29.

Typical composition of the gas reclaimed from line 35 is 1% $SO_2$, 45% $CO_2$, 36% $N_2$, 3% $O_2$, 15% $H_2O$ vapor.

A further stage of flashing is carried out by conducting the partially denuded aqueous solution of sulfur dioxide via line 40 to flash stage 41, where pressure is maintained at a level of about 100 millimeters of mercury, and released gas is removed via line 42 to enter line 43, and be forced by pump 44 back through the product lines 36, 24, and ultimately to 27. The gas obtained at this stage of reduction of pressure has a composition of about 1.5% of sulfur dioxide, 65% of carbon dioxide, 5% of nitrogen and 1% of oxygen, together with 27.5% of water vapor. By passing it through the condenser 45, water is recovered through line 46 and returned to the circulating system in line 29.

A further stage of reduction may be advisable in some operations for effective recovery of sulfur dioxide and, consequently, the aqueous solution of sulfur dioxide is taken from flash tank 41 via line 47 to flash zone 48 wherein it is under a pressure of the order of about 30–60 millimeters of mercury and the product gas is passed by line 49 to line 50 where a pump 51 forces it through condenser 52 to remove water and on into product collecting lines 43, 36, 24 and, ultimately, discharge product line 27. Water condensed from the gas in condenser 52 is recovered by line 53 and returned to the circulating system by having it join line 29.

Gas at this stage after condenser 52 has a composition of 60% $SO_2$ on a dry basis. Water vapor removal determines final composition at this stage.

The flashing stages of gas recovery are desirable because they constitute a very practicable means for accomplishing at least partial recovery of the gases from the solution. Recovery of gases need be carried beyond this stage only if desired.

A final finishing operation is conducted by carrying the residual, denuded, aqueous solution of sulfur dioxide via line 54 to a stripper 55, where the solution is sprayed into a very large stripper and subjected to a very low pressure of the order of 20–30 millimeters of mercury. At this low overall pressure, virtually all gases remaining in solution in the water are released and a gas having a composition of 2% sulfur dioxide, 2% carbon dioxide, 0% nitrogen and 0% oxygen and 96% $H_2O$ vapor is removed via conduit 56 to pass to pump 57 where it is discharged into conduit 58, passes through water condenser 59 and is discharged into line 60 to be moved then by pump 61 through line 62, condenser 63 and line 64 where it ultimately passes back through the reduced pressure system and is discharged into atmospheric pressure product line 27 as an enriched product gas. Note, removal of water vapor gives a gas which approaches 50% $SO_2$.

Water is recovered from the final product gas in condenser 59 by being passed through line 65 and further condensate from line 66 joins the recovered water in line 67 where it ultimately joins line 29 seriatim with the water recovered in the several condensers at the several stages of flashing in the flash stage.

The almost fully denuded water collected in the stripper 55 is preferably subjected to a certain amount of heating to finish the stripping. At this stage, at this temperature and at this pressure, relatively little heating is required to remove residual amounts of gas. Accordingly, heat is generated by taking hot water from the gas cooler 11 via line 70, and passing it to low pressure steam generator, or flash stage, 71. The water at this stage having gone through the cooler to cool the gases will have taken up sensible heat sufficient to raise its temperature to about 125°–150° F. Accordingly, a substantial amount of low pressure steam is available from it. The water is passed via line 70 into the flash tank 71 where the pressure is maintained at a level of about 30 millimeters of mercury, that is, comparable with the pressure in the stripper, and a substantial fraction of the water evaporates to give steam, which is passed into the stripper 55 to heat the water being stripped at that stage. The steam passes up through line 72 into the stripper where any uncondensed steam joins the stream of product gas leaving the system via conduit 56.

Partially cooled water from the flash steam generator 71 may be passed through line 73 to a second flash tank 74 to generate additional amounts of low pressure steam. This portion of the system is likewise maintained at about 20 millimeters of mercury, namely, a pressure comparable to that in the stripper. In view of the fact there will be no significant pressure differential to induce movement of vapor, the exit line 75 passes to pump 76 which moves the low pressure steam through line 77 into the stripper for the final finishing stripping duty called for at this point. Vapors can be recompressed to the extent deemed desirable. The stripped, denuded water accumulating in the bottom of the stripper passes via line 78 through pump 79 and discharge line 80 back to the absorber.

In the stripper 54, the low pressure steam is injected directly into the water to heat the water and condense the steam.

Depending upon the amount of excess air used in the combustion of the gas, a small amount of sulfur trioxide will be found in the hot flue gas, which sulfur trioxide in this system will accumulate as sulfuric acid in the recycling water. Accordingly, a bleed line 81 to remove a certain amount of the water from the system and thus keep the acid content at the most convenient pH for absorption and desorption is provided. To compensate for the water loss for the system through the bleed and the other losses in the system, a water make-up line 82 is provided at the absorber.

If an acid plant is used this water can be used as make-up in that process.

It is also quite convenient to keep the acid concentration at a level such that when neutralized with lime, it gives a solution of calcium sulfate which can then be discarded as waste.

It will be apparent that the water recovered from the stripper is ready for recycle duty and passes through line 80 to join line 19, minus any bleed, plus make up, to go through the cycle of absorption again.

The flash steam generator 74 similarly provides for water recovery and water obtained therefrom passes via line 85 through pump 86 to line 87 to rejoin line 13 at the point of entry to the gas cooler, again to pass through the system for recycle duty. Water in line 87 returning to the gas cooler will have a temperature of about 80°, or generally slightly below the ambient level predicated for the entire system.

Statistical data for the system

It is important in the consideration of this system that a realistic estimate of the nature of the equipment and the scale of the operation be evaluated. Thus, a 1000 megawatt power generating station consumes about 13,000,000 barrels of fuel oil per year. The oil generally contains from one to three or four percent of sulfur.

The temperature of a gas entering the $SO_2$ recovery system will be of the order of 350° F. and it will be at substantially atmospheric pressure. The total flow of cooling water through line 13 will be of the order of one million pound mols per hour introduced via line 13 (this is 18 million pounds of water per hour). A small auxiliary amount of the order of 25 thousand pound mols per hour will be introduced in the pre-spray zone via line 31.

The water introduced may be taken for purposes of the example as being at 81° F. meeting gas at 350° F. Gas flowing out of the cooler to the absorber will have lost a certain amount of sulfur dioxide and will contain at this stage about 628 pound mols per hour of sulfur dioxide.

The operation thus involves handling large volumes of gas to concentrate the small proportions of sulfur dioxide which occur in the gas. This, in turn, bespeaks special equipment and, in particular, equipment which is of substantial size to handle the volumes of gas which necessarily must be moved through the system at ambient temperatures and under quite low pressure differentials. Generally, within the system, for most economical operation, a pressure differential is nowhere more than 10–20 inches of water between the inlet and the outlet from a circuit.

Fundamentally, good operation depends upon having a relatively low ambient temperature and, as indicated, this temperature is of the order of 32°–125° F. and within this range, the effectiveness of the temperature is related to the dew point of the air in the cooling tower, or in the heat sink, which is used. It should be noted that in the system there are a number of heat exchangers. For effective operation, unless there is a large river nearby which would permit passing a natural stream of water once through the system in the heat exchange step, a cooling tower must be provided to have water available at a useful cooling temperature. Similarly, in all of the condensers cooling water is needed. Hence, the dependence of efficient operation on the actual dew point of ambient air; or better still, refrigerating the absorption water to incipient freezing, 33°–37° F.

A second basic variable in the process, which should be recognized as having its effect on efficiency, is that if free solution and ionization of sulfur dioxide in water is permitted, the solubility of the gas is relatively high and the total water flow is reduced. Of course, a minimum water flow is achieved when maximum solution of sulfur dioxide is achieved, but this condition of operation can never be fully attained. If ionization of the sulfur dioxide is repressed, the solubility of sulfur dioxide gas in the water is reduced and the total flow of water through the system is increased. The accumulation of sulfuric acid in the system and the oxidation of a certain amount of sulfurous acid to sulfuric represses the ionization of the sulfur dioxide solution. Hence, to maintain a balance of this variable, the bleed for removal of a certain amount of acid from the system is provided and, likewise, the feed for the addition of a certain amount of fresh water is also provided.

The gas cooler 12, the first large apparatus in the system, may be built in the form of a generally conventional packed tower, with counter flow or cross flow provided. The tower of conventional construction should, of course, be of material which is resistant to corrosion, because of flue gas, especially the hot flue gas in the presence of a certain amount of water, is inherently a corrosive material. For the 1000 megawatt installation selected as the typical example herein, the tower should have a cross sectional area of about 5,000 square feet, matched with a packing height of about 5 feet.

The absorber 17 is also generally of a conventional form of construction. The material may be a steel tank, appropriately protected against corrosion. However, a useful form of structure is also a tower of reinforced concrete and lined with epoxy resin to minimize corrosion or solution of the concrete itself. In size, the absorber is of the order of 5,000 square feet cross section, carrying about an 8 foot pack of any suitable packing.

The flash tanks 22, 34, 41 and 48 also items of equipment which, because of special operation, may be looked upon as special. They are generally steel tanks and each about 5,000 square feet in cross section about two feet depth of packing. Here, likewise, it would be possible to construct the tanks of other materials, for example, the reinforced concrete with the epoxy liner.

The stripper 55 is another large tank suitable for passing the large volumes of solution and gas being handled and, for the 1000 megawatt installation described herein as typical, a 5,000 square foot cross section is suitable with about 18 feet of packed section. This total order of magnitude, as can be appreciated, is not significantly different from that of a conventional municipal gas storage tank of substantial capacity.

The pumps indicated in the system at 25, 37, 44, 51, 61 and 76 are quite substantial pumps and generally, for moving the total volume of gas contemplated in the system, there will be of a capacity demanding a total power of 10,000 horse power.

While the scale of the equipment and general size are quite substantial, this is only in connection with a large municipal installation, such as a 1000 megawatt power station. The total volumes of gas and total amount of sulfur dioxide in a situation of this kind are quite large and, in an industrial area justifying an installation of ths size, there will be a substantial demand for sulfuric acid. The product gas obtained from this system, which contains approximately 25% sulfur dioxide, together with accompanying nitrogen, carbon dioxide and some oxygen is suitable for use directly in a process for making sulfuric acid.

The total system may be connected directly to the sulfuric acid system, wherein the enriched sulfur dioxide gas is passed into reaction chambers to contact oxygen and catalyst for conversion to sulfur trioxide and is thereafter absorbed in water to form sulfuric acid.

Similarly, if it is desirable, a carbon dioxide recovery unit can be installed to process this part of the product gas.

The temperature of the gas entering the absorber will be about 86° F. That is, it will have been reduced in temperature and cooled substantially to the temperature of the cooling water.

With this quantity of gas entering the absorber, the absorber must be designed to be large enough and have enough water flowing therethrough to take up substantially all of the sulfur dioxide in accordance with requirements of the installation. Feasibility study indicates that 75% of the sulfur dioxide flow can be readily recovered. Accordingly, at the absorber, entering via line 19, there are about 13.5 million pound mols per hour of water. This virtual river of water is taken from the absorber and passed to the flash stages and the effluent from stage 1, namely, tank 22, will be about 100 pounds mols of water per hour as vapor. This obviously is not very great. Similarly, at stage 2, the effluent gas will contain 250 pound mols of water vapor. Again, a not very large flow. At stage 3, namely, in line 42, there will be a water vapor flow of 540 pound mols per hour. Again, relatively small, and at the final stage in line 49, the flow of water vapor will be of the order of 1000 pound mols per hour by evaporation. Consequently, it will be obvious that most of the flow in the system is liquid flow and most of the liquid water coming from absorber via line 21 is fed into the stripper at subsequently full volume to be subjected to high vacuum and some heating to remove all the sulfur dioxide. The discharge from the stripper accumulates virtually all the water flowing, namely, about 13.5 million pound mols per hour.

Similarly, the flow of gas can be analyzed and at each stage of the flash, a certain proportion of the sulfur dioxide is recovered, but the significant recovery in the process occurs in the stripper where the product gas entering line 55 contains about 475 pound mols per hour of sulfur dioxide. The product gas obtained at each stage of the pressure reduction is much enriched in sulfur dioxide as compared with the gas which passes out of the system at absorber 18 through line 20, because most of the sulfur dioxide, some carbon dioxide, with some nitrogen and oxygen, are dissolved in the absorber.

It is the reclamation of this dissolved gas mixture which characterizes the operation. The discharge through line 20 may contain as much as 150 pound mols per hour of the sulfur dioxide, but as indicated, the extent of the reclamation of sulfur dioxide at this stage is directly proportional to the size and efficiency of the absorber. As a practical matter, the absorber used is a large, packed tower to create a large surface area for absorption, and the height of the tower is made as low as possible, consistent with maximum absorption of sulfur dioxide and feasible operation and low pressures. It should be understood that the operation of the system requires that the gas pass through the absorber with a pressure drop of relatively only a few inches of water column. This consequently limits the height of the tower available. It should be noted, however, that a reasonable equilibrium balance can be obtained in this aqueous absorption system, wherein the absorber is of the size indicated. The system will quite effectively absorb about 75% of the sulfur dioxide content of the flue gas.

In view of the very large volume of gas being handled in the flash tanks and in the stripper, it is important to note that the pumps 57 and 61, as well as 25, 37, 44, and 51 must be specially adapted to the handling of very large volumes of gas at extreme low pressures. Such equipment is identified in picturesque engineering slang as a "nothing pump," a reference to the fact that the vapors being handled are at the extreme low absolue pressures. An application of such equipment is to move water vapors or the gaseous vapors found above liquids maintained at partial pressures of the order of 10-20-30 millimeters of mercury. To move such vapors, the characteristic feature of the pump that the vanes which are rotated in the space to gather and move the vapors in some designs are nothing more than flexible vanes mounted on frames and pitched to collect and discharge the gas through large conduits and to perform this operation in stages so as to move the gas at these low pressures where relatively no differential pressure is available for the purpose.

In recapitulation it is to be noted that the process makes use of the Henry constants, or water solubility characteristics of sulfur dioxide, carbon dioxide, and nitrogen, etc., in relation to the steps for removal of sulfur dioxide. By first cooling the combustion or roaster gas, then dissolving as much sulfur dioxide as possible, and thereafter, flashing or stripping the solution, a real concentration of sulfur dioxide can be effected. The handling of the large volumes of gas and water is a technological problem which is not without serious difficulty, but it relates only to the scale of operation. The following tabulation summarizes the process related to combustion gas in treating that obtained at a 1000 megawatt power station, the gas composition and flow being related to the flow diagram by the key letters indicating the points in the system where the flow conditions indicated prevail.

The following tabulation shows the various quantities. In order to make it simpler to follow the table, columns are headed with capital letters which appear also on FIG. 1.

been used for this purpose, it is relatively free of sulfur dioxide.

The main gas stream now passes from the gas cooling tower at a temperature of about 60° F. via line 225 into tower 226 where it is subjected to sulfur dioxide absorbing conditions. Water is fed in via line 227 and contacts the gas in a packed tower of large cross section, generally for the volumes being processed it will be of the order of 4,000 to 5,000 square feet, and the solution of sulfur dioxide passes out through line 228 to pump 229 to be passed by line 230 to the stripping tower.

Gas fed via line 225 to absorber 226 exits from the absorber relatively clean and free of sulfur dioxide through line 231 and is taken by blower 232 and line 233 to the water cooling tower 222 where it flows countercurrent to water from the gas cooling tower and, thereafter, passes via line 224 through the stack and is discharged to the atmosphere. When it is in condition for gas discharge, typical analysis indicates the gas will contain about 0.045% of sulfur dioxide.

| | | | | | Stream No. | | | | | | |
|---|---|---|---|---|---|---|---|---|---|---|---|
| Component | A | B | C | D | E | F | G | H | I | J | K |
| | Hot Flue Gas | Pre-spray Water | Cooled Flue Gas | $SO_2$ Stripped | Gas Cooler Underflow | | Flash No. 2 Underflow | Flash Steam | Flash No. 1 Underflow | Off Gas Flash Evaporation | Condensate |
| 1.... $SO_2$ (Lb. Mols/hr.) | 647 | 5.6 | 628.8 | 150 | 23.8 | 23.8 | 0 | 5.6 | 0 | 18.2 | 5.6 |
| 2.... $CO_2$ (Lb. Mols/Hr.) | 35,800 | | 35,800 | 34,835 | | | | | | | |
| 3.... $N_2$ (Lb. Mols/Hr.) | 212,000 | | 212,000 | 211,885 | | | | | | | |
| 4.... $O_2$ (Lb. Mols/Hr.) | 8,550 | | 8,550 | 8,541 | | | | | | | |
| 5.... $H_2O$ Steam (Lb. Mols/Hr.) | 25,350 | | 11,850 | 11,850 | | | | | | | |
| 6.... $H_2O$ Liquid (Lb. Mols/Hr.) | | 25,500 | | | 1,058,000 | 1,058,000 | 1,033,000 | 5,100 | 1,038,100 | 21,600 | 27,00 |
| 7.... | | | | | | | | | | | |
| 8.... Total Flow (Lb. Mols/Hr.) | 282,347 | | | | | | | | | | |
| 9.... Temperature (° F.) | 350 | 86 | 86 | 86 | 126 | 108 | 81 | 86 | 86 | 86 | 86 |
| 10... Pressure (mm. Hg) | 760 | | 760 | 760 | | | | 31.8 | | 31.8 | |

| | | | | Stream No. | | | | | | |
|---|---|---|---|---|---|---|---|---|---|---|
| Component | L | M | N | O | P | Q | R | S | T | U |
| | Preflash Liquid | Stripped Liquid | Stripped Off Gas | 2d Stage Suction | 3d Stage Suction | 4th Stage Suction | 5th Stage Suction | 6th Stage Suction | Product Gas | Balance Stream |
| 1.... $SO_2$ (Lb. Mols/Hr.) | 512.6 | 33.8 | 474 | 474 | 497 | 500.7 | 501.4 | 502 | 497 | |
| 2.... $CO_2$ (Lb. Mols/Hr.) | 965 | 0 | 287.5 | 287.5 | 731.5 | 910 | 956 | 965 | 965 | |
| 3.... $N_2$ (Lb. Mols/Hr.) | 115 | 0 | | | 1.1 | 13.2 | 49.6 | 116 | 115 | |
| 4.... $O_2$ (Lb. Mols/Hr.) | 9 | 0 | | | 0.325 | 2.375 | 5.5 | 9 | 9 | |
| 5.... $H_2O$ Steam (Lb. Mols/Hr.) | | | 26,500 | 4,420 | 1,255 | 540 | 271 | 137 | 70 | |
| 6.... $H_2O$ Liquid (Lb. Mols/Hr.) | 13,500,000 | 13,500,000 | | | | | | | | |
| 7.... | | | | | | | | | | 1,503 |
| 8.... Total Flow (Lb. Mols/Hr.) | | | | | | | | | | |
| 9.... Temperature (° F.) | 86 | 86 | | | | | | | | |
| 10... Pressure (mm. Hg) | | | 31.8 | 37.4 | 86 63 | 86 116 | 86 210 | 86 406 | 86 760 | |

A quasi-continuous flash staging modification is shown in FIGS. 2A and 2B, which constitute a flow diagram quite similar to that shown in FIG. 1, but illustrate an alternative version of the stripping operation, flue gas from a boiler plant enters the system through line 200 to pass through air preheater 201 to a water spray for cooling the gas at 203. The gas enters a solid particle scrubber 204 where it is contacted with water circulated by line 205 and pump 206 from thickener 207, which is fed by the water-solid suspension 208 obtained from the particle scrubber. The gas now at a temperature of about 100° F. passes through line 209 to precooling tower 210 where it is met by cooling water, fed in by line 211 which has passed through heat exchanger 212 via line 213, the motive power being supplied by the pump 214 which received the water via line 215 from the gas precooling tower. River water is fed to the heat exchanger at ambient temperature of about 70° (as a typical summer level) through line 216 and returned via line 217 at possibly as much as 90° F.

The gas passes via line 218 to gas cooling tower 219 where it is met by water fed in by line 220, circulated by line 221 from water cooling tower 222. The water for the cooling tower 222 is received from the gas cooling tower via line 223. The gas used in the water cooling tower passes via line 224 to the stack. By the time it has The important part of the process economically is that which involves the removal of the absorbed sulfur dioxide from the aqueous solution. This actually is a relatively dilute solution of sulfur dioxide and it is necessary to strip it to recover the large quantity of sulfur dioxide which is dissolved in the total volume of water.

An alternative to the technique described in connection with FIG. 1 is shown in FIGS. 2A and 2B, wherein the apparatus is shown diagrammatically in vertical section. It takes the form of a high tower which, for the volume of solution anticipated to be stripped, would have a cross sectional area of 2,140 square feet. The tower consists of the structure 240 consisting of walls 241, top 242 and bottom 243. By means of appropriate piping, the solution of sulfur dioxide, generally containing about $8 \times 10^{-5}$ mol fraction of sulfur dioxide in water is fed by way of line 230 to the top of the tower where it is sprayed out over just a packed stage. To form the stage physically, a baffle extends across point or level 250 to define a stage with distributor plate 251, which also extends across the tower. Packed section 252 is supported above distributor plate 251. Each stage is sealed with water by keeping a certain liquid level over the distributor plate, whose open area is calculated in such a way as to give the proper flow to the next stage. The water seal is indicated as 253.

In the succeeding section defined by the distributor plates 251 and 261 is the packed section 252 in which the pressure is maintained at about 20 millimeters by water seal 263.

Similarly, the stage defined by distributor plates 261 and 271 carrying the packed section 262 is maintained at a pressure level of about 9 millimeters with a water seal 273 on the distributor.

The next stage defined by distributor plate 281 with packed section 282 is maintained at a pressure level of about 6 millimeters by water seal 283.

The next stage defined by distributor plates 281 and 291 with its packed volume 292 is maintained at a pressure of about 5.75 millimeters by water seal 293. Similarly, the next and the final stages are defined by distributor plates 291 and 294, and 294 and the bottom of the tower, carrying the packed sections 292 maintained at pressures of about 5.58 and 5.44 millimeters of mercury each, by water seal 293 and water 295 in the bottom of the tower.

The stripped water is removed via line 296 and pumped back into the system through line 227 and into the absorber to carry on further absorption duty.

On the drawing the compositions of the gases are given next to the lines where they come off. These compositions of gases will be given in pound moles per hour. Total gas flows appear on the drawing in cubic feet per minute, and liquid flows in gallons per minute. Concentration of $SO_2$ in flow lines, such as 241, 228, etc., are given in mol fractions. It will be seen that the gas recovered from the first stage is largely carbon dioxide with some water vapor, and the sulfur dioxide is recovered in subsequent stages, a substantial part in the second stage and in the third stage. Similarly, in the fourth stage, the drawing indicates the gas contains a large proportion of sulfur dioxide and by the fifth stage of the stripping the proportion of sulfur dioxide has passed through the maximum and in the sixth and seventh stages it is dwindling down to a low level.

Advantage is taken of the fact that on each of the levels of the stripper, the product gas will have different proportions of recovered $SO_2$ gas in it. Accordingly, in the diagram shown in FIGS. 2A and 2B the optional alternative for collecting the recovered sulfur dioxide is shown. It should be understood that where gas is collected from a sequence of seven stages of flashing the designer has a plurality of options in laying out the gasflow subsequent to the absorber.

The diagram indicates a typical very useful version of stripping for the recovery of the product gas which would be relatively rich in sulfur dioxide. In accordance with the diagram therefore the recovery is carried out by taking gas from the first stage which, of course, at a pressure of 300 millimeters and passing it out of the system through line 300 to compressor 301 where it is joined by inert gases and sulfur dioxide fed thereto by a pipe 302. The gas passes through conduit 303 into heat exchanger 304 where it is cooled by water entering through 305 and passing out through conduit 306, the gas passing by conduit 307 to product recovery, or passing out of the system as product gas.

Gas from the second stage of recovery coming at 20 millimeters is passed by a line 310 to compressor 311 then by a line 312 to a fourth stage compressor 313, then by line 314 to a fifth stage of compression 316, then line 317 to a condenser 318 and flowing out of the condenser is pumped as product gas at about 95° F. into line 302 for final recovery. Water for the condenser comes from a heat exchanger which is cooled by water entering by line 319 and exiting through line 320. The cool water passingfi by line 321 around the circuit to be served as a cooling water for the condenser. Bleed of the condensed water vapor can be removed from the system by line 322.

Gas recovered from the third stage of the stripper passes by line 330 to join gas from the remaining stages by line 331.

As can be seen from the diagram, when the pressure in the stripper becomes of the order from 5 to 10 millimeters of mercury the separate gas streams can be joined or merged to suit the convenience of the operator or the installation. Thus, line 332 takes gas through valve 333 to line 334. Similarly, line 330 takes gas through valve 339 to line 334. Also, line 337 takes gas through valve 338 to line 34 and similarly gas from the final stage of the stripping is taken by line 339 through valve 340 to line 334. This gas in any combination of streams from the stripping zones arrived at the compressor 341 at a pressure of the order of 5 millimeters of mercury and is compressed to a somewhat higher pressure of the order of 8 millimeters of mercury and passed to the second stage of compression at 342 from which it is discharged by lines 343 into condenser 344 where it is met by a stream of refrigerated water coming from line 345, refrigerated at refrigeration unit 346, which is fed by discharge water from the condenser, coming by a line 347 through pump 348 and line 349. Bleed is removed from the system by a line 350.

The gas recovered from the condenser is now cooled to a temperature of about 39° F., passes out of the absorber by a line 351 to joint other product gas at about 20 millimeters of mercury passed through the third stage of compression, compressed at 311, thereafter through the fourth state 313 and a fifth stage 316 and, hence, through th e condenser at 318 and ultimately to the product line.

As indicated, these latter stages of gas recovery will be subject to variation in accordance with the design preferred by the designer or the particular operation or installation desired. Notable in the design, of course, is the use of refrigeration to keep the absorption and condensing temperatures low for improved efficiency and handling of sulfur dioxide solutions at low temperatures, preferably as close to 32° F. as is feasible. A range within 1°–5° of freezing, i.e., 33°–37° F. is practicable.

We claim:
1. A process for recovering sulfur dioxide from hot combustion gases which comprises,
  (a) cooling the gases,
  (b) passing the cooled gases into an absorbing zone, subjecting the gases to contact with a large volume of water, and maintaining them therein for a sufficient time to dissolve a major portion of the sulfur dioxide to form a dilute aqueous sulfur dioxide solution,
  (c) passing said solution through flash zones at decreasing pressures, maintaining in the first zone a temperature and pressure which flashes a gaseous mixture having substantially a maximum proportion of gas to water vapor, and
  (d) collecting gas from said flash zones, compressing to approximately atmospheric pressure, and removing moisture vapor therefrom.

2. A process according to claim 1 in which liquid water from said flash stages is recycled to the absorbing zone.

3. A process according to claim 1 in which liquid from the last sub-stage is passed through a stripping zone in which residual sulfur dioxide is substantially stripped by steam.

4. A process according to claim 3 in which the stripping stage is supplied with low temperature steam from flashing of heated water from the cooling stage.

5. A process according to claim 1 in which sulfur dioxide ionizing-repressing sulfur trioxide is periodically purged to maintain the sulfur dioxide in the absorbing stage in substantially ionized form.

6. A process according to claim 1 in which the flashing in the stages is under substantially isothermal conditions.

7. A process according to claim 3 in which the flashing in the stages is under substantially isothermal conditions.

8. A process according to claim 3 in which the gases from the lowest pressure flash stage are contacted with chilled water.

References Cited

UNITED STATES PATENTS

| | | | |
|---|---|---|---|
| 2,447,834 | 8/1948 | Balcar | 55—44 |
| 2,598,116 | 5/1952 | DuBois | 55—73 |
| 3,102,012 | 8/1963 | Dowd | 55—48 |
| 3,232,027 | 2/1966 | Lorenz et al. | 55—44 |
| 2,806,552 | 9/1957 | Koble | 55—43 |
| 2,886,123 | 5/1959 | Miller et al. | 55—43 |
| 3,260,035 | 7/1966 | Wheelock et al. | 55—73 |

REUBEN FRIEDMAN, Primary Examiner

C. N. HART, Assistant Examiner

U.S. Cl. X.R.

55—51, 73